United States Patent
Critelli et al.

(10) Patent No.: US 11,456,857 B2
(45) Date of Patent: *Sep. 27, 2022

(54) CRYPTOGRAPHY METHOD AND CIRCUIT, CORRESPONDING DEVICE

(71) Applicant: STMicroelectronics S.r.l., Agrate Brianza (IT)

(72) Inventors: Rosalino Critelli, Misterbianco (IT); Giuseppe Guarnaccia, Augusta (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 440 days.

This patent is subject to a terminal disclaimer.

(21) Appl. No.: 16/433,847

(22) Filed: Jun. 6, 2019

(65) Prior Publication Data

US 2019/0386816 A1     Dec. 19, 2019

(30) Foreign Application Priority Data

Jun. 15, 2018   (IT) .......................... 102018000006363

(51) Int. Cl.
| | |
|---|---|
| *H04L 9/06* | (2006.01) |
| *G06F 13/16* | (2006.01) |
| *G06F 21/60* | (2013.01) |
| *H04L 9/14* | (2006.01) |

(52) U.S. Cl.
CPC ........ *H04L 9/0631* (2013.01); *G06F 13/1668* (2013.01); *G06F 21/602* (2013.01); *H04L 9/14* (2013.01); *H04L 2209/12* (2013.01)

(58) Field of Classification Search
CPC ......... H04L 9/06; H04L 9/0631; H04L 9/065; H04L 9/14; H04L 2209/12; H04L 2209/122; H04L 2209/125; G06F 21/602; G06F 21/71; G06F 21/72; G06F 21/74;
(Continued)

(56) References Cited

U.S. PATENT DOCUMENTS

| | | | |
|---|---|---|---|
| 8,874,926 B1* | 10/2014 | Edwards ............... | G06F 21/556 713/180 |
| 10,237,066 B1* | 3/2019 | Langhammer ........ | H04L 9/0631 |
| 11,042,655 B2* | 6/2021 | Guarnaccia ............ | G06F 21/85 |

(Continued)

OTHER PUBLICATIONS

Tan et al., "Optimization and Benchmark of Cryptographic Algorithms on Network Processors," IEEE Micro, vol. 0272-1732/04, pp. 55-69, 2004.

*Primary Examiner* — Minh Dinh
(74) *Attorney, Agent, or Firm* — Seed Intellectual Property Law Group LLP

(57) ABSTRACT

A cryptographic method includes providing memory locations for storing encrypted data. The memory locations have respective addresses and are accessible via a communication bus. The method includes receiving over the communication bus access requests to the memory locations, wherein the access requests include burst requests for access to respective sets of the memory locations starting from respective start addresses, and calculating as a function of the start addresses encryption/decryption cryptographic masks based on cryptographic keys. Plain text data is received for encryption and the method includes applying the cryptographic masks to the plain text data to obtain therefrom encrypted data, and including the encrypted data into output data for transmission over the communication bus.

21 Claims, 3 Drawing Sheets

(58) Field of Classification Search
CPC ............. G06F 21/85; G06F 2221/2125; G06F 13/1668
See application file for complete search history.

(56) References Cited

U.S. PATENT DOCUMENTS

| | | | |
|---|---|---|---|
| 2002/0010883 A1* | 1/2002 | Coffey | G06F 11/3034 |
| | | | 714/712 |
| 2005/0021986 A1 | 1/2005 | Graunke et al. | |
| 2005/0276413 A1 | 12/2005 | Neogi | |
| 2007/0050642 A1 | 3/2007 | Flynn et al. | |
| 2007/0140477 A1 | 6/2007 | Wise | |
| 2007/0162610 A1 | 7/2007 | Un et al. | |
| 2008/0019524 A1* | 1/2008 | Kim | H04L 9/0631 |
| | | | 380/259 |
| 2009/0327716 A1* | 12/2009 | Raju | H04L 9/3242 |
| | | | 713/168 |
| 2012/0144079 A1* | 6/2012 | Sakaguchi | G06F 13/4059 |
| | | | 710/110 |
| 2013/0080790 A1 | 3/2013 | Pean et al. | |
| 2016/0021401 A1 | 1/2016 | LaBosco et al. | |
| 2016/0171249 A1 | 6/2016 | Circello et al. | |
| 2016/0364343 A1* | 12/2016 | Case | H04L 9/0637 |
| 2020/0313860 A1 | 10/2020 | Junttila et al. | |

\* cited by examiner

CRYPTOGRAPHY METHOD AND CIRCUIT, CORRESPONDING DEVICE

BACKGROUND

Technical Field

The description relates generally to cryptographic techniques, and more specifically to encryption engines for fast encryption of data stored in a memory for use by a microcontroller.

Description of the Related Art

Microcontrollers such as, for instance, STM32 microcontrollers (as available with companies of the STMicroelectronics group) have been recently introducing an increasing number of security features. Such security features may involve encryption of data (for instance, executable code) stored in an external memory for use by a microcontroller. Data stored in an external memory may be retrieved by a microcontroller, for instance, over a high-performance bus such as, for instance, an Advanced eXtensible Interface (AXI) bus.

On one hand, basic decryption processing of such encrypted data performed by the microcontroller may introduce latency which is hardly compatible with high-performance bus operation, where "on the fly" decryption may represent a desirable feature.

On the other hand, basic encryption processing of the data to be stored in the external memory (for instance, executable code for execution in a microcontroller) may be slow and/or involve dedicated processing cores.

BRIEF SUMMARY

Despite the extensive activity in the area, further improved solutions are desirable.

For instance, solutions are desirable which may facilitate encryption of data with improved encryption speed and reduced impact on silicon area.

One or more embodiments may provide a hardware solution, suitable to be plugged onto a communication bus for cooperation with a microcontroller and a memory controller for access to an external memory.

One or more embodiments may involve a deep pipeline to perform address decoding, generation and data decryption/encryption in parallel, for instance during Advanced Encryption Standard (AES) mask mining.

One or more embodiments may rely on a decryption/encryption engine based on a finite state machine (FSM) solution performing "speculative" trigger of AES mask generation and burst field extraction to manage in an improved way the response data flow.

One or more embodiments may thus address the problem of fast encryption of plain text data for storage in a memory for successive use by a microcontroller, with reduced area impact and/or reduced latency impact.

One or more embodiments facilitate providing an optimized decryption/encryption engine, enabling code protection and fast code execution from external memory.

On or more embodiments may provide a "reversible" cryptographic engine, switchable between an encryption state wherein the cryptographic engine processes input plain text data to generate output encrypted data, and a decryption state wherein the cryptographic engine processes input encrypted data to generate output plain text data.

One or more embodiments may thus permit microcontroller users to make available to third parties protected firmware for execution without disclosing the content.

One or more embodiments may be applied for instance to general purpose, high-performance microcontrollers (MCUs) as increasingly used for instance in the area of IoT (Internet of Things).

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
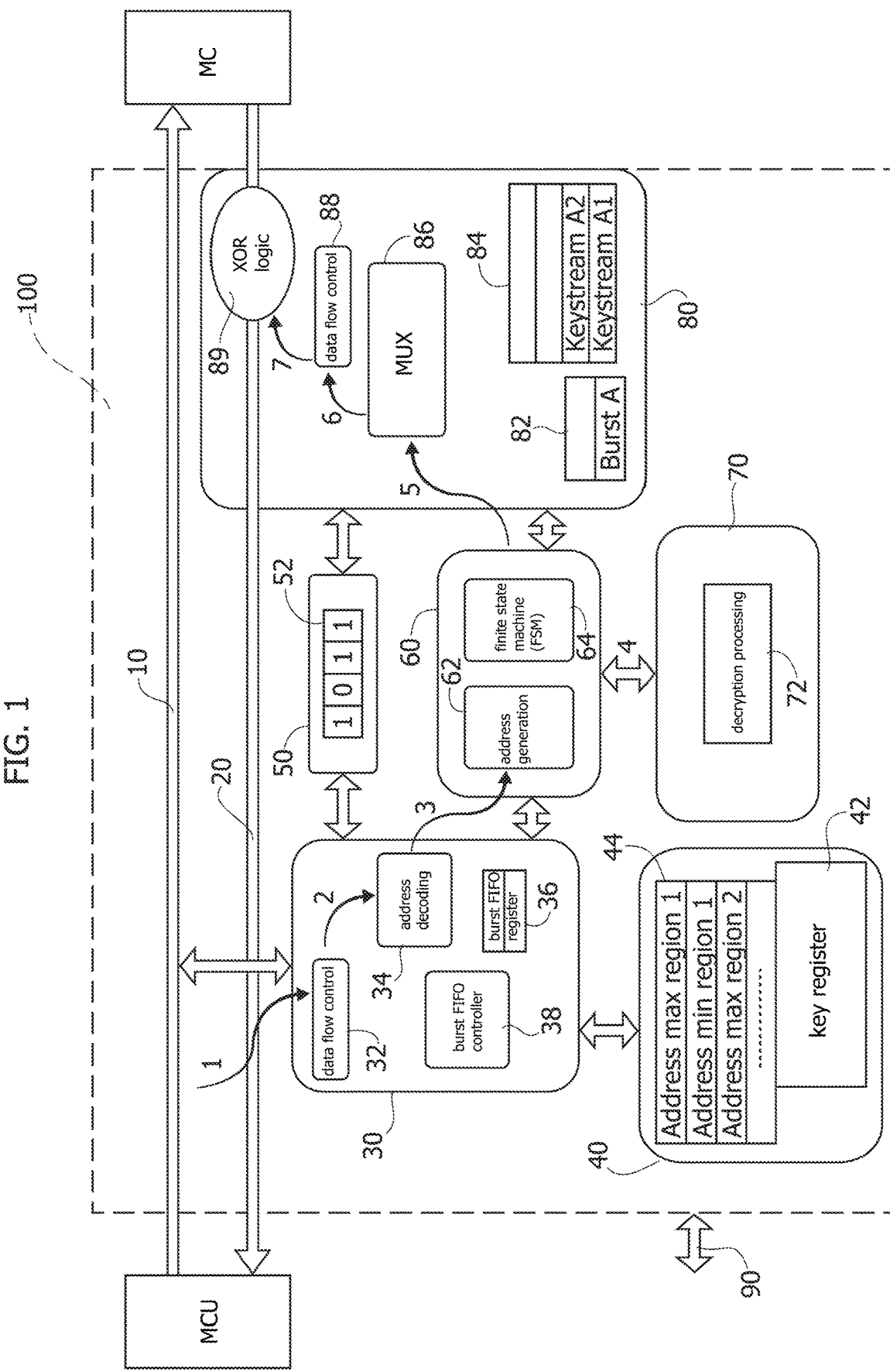
FIG. 1 is a block diagram exemplary of a possible encryption/decryption engine in embodiments of the present disclosure.

By way of introduction to a detailed description of exemplary embodiments, reference may be first had to FIG. 1.

FIG. 1 is representative of a top level architecture of a so-called "IP core" for data encryption/decryption, with the arrows showing the temporal and logic flow of the data encryption/decryption process, and the corresponding pipeline.

As known in the art, the designation IP (intellectual property) core applies to a block of logic or data which may be used, for instance, in providing an application-specific integrated circuit or ASIC or a programmable gate array or FGPA for an electronics product, thus facilitating design reuse.

In the following, registers operating according to the "First In, First Out" method are briefly referred to as FIFO registers. Possible implementations of such registers are well known to the person skilled in the art and therefore will not be further explained herein.

In the diagram of FIG. 1, which provides a high-level exemplary representation of a decryption/encryption circuit 100, the following elements are exemplified:

a processing unit MCU, for instance a microcontroller unit, external to the decryption/encryption circuit 100;

a memory controller MC, external to the decryption/encryption circuit 100 and adapted for cooperation with an external memory (not visible in FIG. 1) storing (encrypted) data, a first (bi-directional) data bus (for instance, an AXI bus) for coupling the microcontroller unit MCU to the memory controller MC, the first data bus comprising an address read channel 10 and a data read channel 20, access points for the decryption/encryption circuit 100 to the address read channel 10 and to the data read channel 20 of the data bus, a burst manager circuit module 30, an AHB registers circuit module 40, a crypt/decrypt outstanding FIFO circuit module 50, a decryption/encryption manager circuit module 60, a keystream generator circuit module 70, a decrypt/encrypt controller circuit module 80, and an access point for the decryption/encryption circuit 100 to a second data bus 90, for instance an Advanced High-performance Bus (AHB) communication bus.

It will be appreciated that the representation of the circuit modules above as distinct entities is merely for the sake of clarity and simplicity. In one or more embodiments, one or more of those circuit modules may be integrated in the form of multi-function circuits. Similarly, in one or more embodiments, one or more of the circuit modules exemplified herein may split into corresponding sets of sub-modules.

Therefore, the above-mentioned circuit modules as exemplified in FIG. 1 may in turn comprise various sub-modules, as discussed in the following.

For instance:

the burst manager circuit module 30 may comprise a data flow control module 32, an address decoding module 34, a burst FIFO register 36, and a burst FIFO controller module 38;

the AHB registers circuit module 40 may comprise a key register 42 and an address region register 44, the crypt/decrypt outstanding FIFO circuit module 50 may comprise a crypt/decrypt FIFO register 52;

the decryption manager circuit module 60 may comprise an address generation module 62 and a finite state machine (FSM) module 64;

the keystream generator circuit module 70 may comprise a decryption processing module 72;

the decrypt controller circuit module 80 may comprise a burst info FIFO register 82, a mask FIFO register 84, a multiplexer (MUX) module 86 (for instance a 64-bit multiplexer), a data flow control module 88, and a XOR logic module 89.

As noted, also the representation of the circuit sub-modules above as distinct entities is merely for the sake of clarity and simplicity. In one or more embodiments, one or more of those circuit sub-modules may be integrated in the form of multi-function modules.

In a circuit as exemplified in FIG. 1, the address region register 44 and the key register 42 may be programmed and/or configured by using the access point to the second data bus 90.

By way of introduction to a detailed description of exemplary embodiments, operation of a circuit 100 as exemplified in FIG. 1 responsive to a data decryption request will be described first.

A circuit 100 as exemplified in FIG. 1 may in fact be used for decrypting encrypted data stored in an external memory upon a data access request from a microcontroller unit MCU.

A circuit 100 as exemplified in FIG. 1 is suitable to be plugged on a data bus 10, 20 for cooperation with a memory controller MC, the data bus being operated in the so-called "burst mode", that is with data transaction requests from the microcontroller MCU being burst requests.

A burst is a data transaction in which multiple data items (or data units) are transferred (for instance from an external memory through the memory controller MC over the bus data read channel 20 towards the microcontroller MCU) based upon a single data address.

Each data unit transferred in a single burst is referred to as a beat, and the same wording applies to the present description. Since each burst is associated with a single data start address, the addresses of the beats in a burst are calculated as a function of the corresponding burst data start address and as a function of the transaction type (or equivalently burst type), for instance fixed, incremental, or wrapping. An access request to a single data unit (i.e., a single beat) in an external memory is also defined as a burst request, i.e., a burst requesting transfer of a single beat.

A data access request (and possibly a data decryption request) is issued on the bus address read channel 10 as a result of the arrival of a burst. A burst request issued by the microcontroller unit MCU on the bus address read channel 10 indicates that the microcontroller is requesting access to data units stored in the external memory, starting from a certain data start address.

The burst carries information comprising:

the start address of the corresponding data units to be retrieved in the external memory (for instance a single 32-bit address), the length of the data transaction (i.e., the number of data beats in the response data transfer, also called burst length), the size of the data units (i.e., the number of significant bits occupied by the retrieved data units in the bus data read channel 20, also called burst size), the burst type (or transaction type), for instance fixed, incremental, or wrapping, in case of wrapping bursts, the burst length for wrapping, and possible other information items about security, cachability, and so on.

In a circuit 100 as exemplified in FIG. 1, the data flow control module 32 may be configured to monitor the status of the decryption processing pipeline, and the processing of the incoming data decryption request may be granted if the processing pipeline is not full.

If processing of the incoming request is granted, the burst is forwarded (with no retiming) to the external memory controller MC for retrieving the corresponding data, which may be encrypted or not encrypted, in the external memory.

In a circuit 100 as exemplified in FIG. 1, the address decoding module 34 may be configured to decode the data start address carried by the incoming data burst and other sideband security information. The data start address may be compared with the address regions in the address region register 44 and the security information may be compared with the security programmed in the key register 42. As a result of such a comparison, the address decoding module 34 may operate a decision as to whether the data corresponding to the incoming burst require a decryption process or not. In fact, the external memory may store both encrypted and non-encrypted data, with certain addresses corresponding to encrypted data units, and other addresses corresponding to non-encrypted data units.

In a circuit 100 as exemplified in FIG. 1, the address decoding module 34 may work "on the fly", i.e., without introducing any delay cycle. In case the data corresponding to the incoming burst require a decryption process, the data flow control module 32 may be configured to forward the burst information to the address generation module 62 if the address generation module 62 is available for processing the current burst, or to store the burst information in the burst FIFO register 36 if the address generation module 62 is not available for processing the current burst (for instance because it is processing the information of a previous burst).

The data flow control module 32 may be aware that the burst FIFO register 36 is full. In such case, the incoming burst may remain outstanding (i.e., the corresponding data access request may not be propagated) until at least one previously received burst is processed, thus providing the possibility to store the information of the incoming burst in the burst FIFO register 36.

In a circuit 100 as exemplified in FIG. 1, parallel processing may allow filling the crypt/decrypt FIFO register 52 in parallel to the operation of the address generation module 62. For instance, if the decision is to decrypt the data corresponding to the incoming burst, the value "1" is stored in the crypt/decrypt FIFO register 52, otherwise, although no information is stored in the burst FIFO 36, the value "0" is stored inside the crypt/decrypt FIFO register 52.

Based on the working principle of FIFO registers, the binary sequence stored in the crypt/decrypt FIFO register 52 is read from the decrypt controller circuit module 80, for instance as a result of a response data sequence being retrieved from the external memory. Reading the values stored in the crypt/decrypt FIFO register 52 will facilitate taking a decision to decrypt the corresponding data using the available masks as described in the following (if a "1" was stored in the crypt/decrypt FIFO register 52), or to directly forward the response data towards the microcontroller unit MCU without applying decryption processing (if a "0" was stored in the crypt/decrypt FIFO register 52). In this latter case, corresponding to burst requests for non-encrypted data units, information about such burst requests for non-encrypted data units may thus not be written in the burst FIFO 36.

It will be appreciated that referring to "1" and "0" values, respectively, is merely by way of example: a complementary choice (for instance "0" and "1" values, respectively), or any other suitable Boolean encoding of such information, may be adopted in a circuit 100 as exemplified in FIG. 1.

In a circuit 100 as exemplified in FIG. 1, if the decision is to decrypt the retrieved data, multiple processing activities may be executed in parallel, for instance being triggered by a burst being forwarded to the decryption manager module 60, the processing activities comprising the mask computation, and/or the address generation, and/or the mask header calculation.

In general, at high clock frequency (for instance more than 300 MHz), several clock cycles may be required to generate one decryption mask, for instance one 128-bit mask.

For instance, the AES counter algorithm may require for instance 11 clock cycles to generate one 128-bit decryption mask. Other encryption/decryption algorithms, which may be used alternatively to the AES counter algorithm, may also require several clock cycles to generate one decryption mask.

It will be appreciated that, in the context of the present description, the terms mask and keystream are used indifferently. Indeed, keystream is the technical denomination used in the context of the AES procedure to indicate the mask to be used for the decryption process of the encrypted data.

In a circuit 100 as exemplified in FIG. 1, decryption processing may comprise an AES procedure, for instance an AES counter procedure. An AES counter procedure may facilitate computing decryption masks as a function of the burst start addresses and other information carried by the corresponding bursts.

The decryption procedure may be triggered for the generation of masks for the decryption of data units of a certain burst by providing input data to the decryption processing module 72. For instance, such input data to the decryption processing module 72 may comprise a secret key (for instance, a 128-bit secret key) and an initialization vector (for instance, a 128-bit initialization vector).

In a circuit 100 as exemplified in FIG. 1, a secret key may be retrieved from the key register 42.

In a circuit 100 as exemplified in FIG. 1, an initialization vector may be computed by the decryption manager circuit module 60 as a function of the data start address and other information carried by the corresponding burst, as discussed previously.

As noted, an AES counter procedure may facilitate computing decryption masks as a function of the burst start addresses and other information carried by the corresponding bursts.

In a circuit 100 as exemplified in FIG. 1, concise information related to burst type (for instance fixed, incremental, or wrapping), burst start address, data units size, burst length, length for wrap, etc., may be extracted and associated with each burst, and saved as "mask header" into the burst info FIFO register 82.

The generated masks may be stored into the mask FIFO register 84, and the computed mask headers may be stored into the burst info FIFO register 82. For instance, multiple masks may correspond to a single mask header (and therefore to a single burst request), for instance due to the big length of the burst (i.e., due to a high number of data units, or data beats, in the response data transfer).

In a circuit 100 as exemplified in FIG. 1, if response data are retrieved from the external memory and sent to the decryption module over the bus data read channel 20 and decryption masks are available, the decrypt controller circuit module 80 may start reading the data stored in the burst info FIFO register 82 and in the mask FIFO register 84, i.e., "popping" such data from the FIFO registers, starting the association of each data beat in the response data transfer with the corresponding mask, or possibly with the corresponding mask portion in case the data units have a size smaller than the masks (for instance if data units are 64-bit long and masks are 128-bit long). Such computation may be executed, for instance, in parallel with the response address generation.

In a circuit 100 as exemplified in FIG. 1, the response data flow may be stopped if the retrieved data units are encrypted, thus requiring decryption, and masks are not available.

In a circuit 100 as exemplified in FIG. 1, the decryption processing performed by the XOR logic module 89 for the applied decryption procedure may consist in XORing, bit by bit, encrypted data (i.e., the so-called ciphertext) and computed masks. This XOR operation returns the decrypted data, i.e., the so-called plaintext.

The burst "outstanding" capability may be critical for the decryption process. It can impact the performance of the application, for instance the execution of the code or an image processing.

A circuit 100 as exemplified in FIG. 1 may be able to manage up to N outstanding bursts, N depending also on the dimensions (or depths) of the implemented FIFO registers, for instance the burst FIFO register 36, the crypt/decrypt FIFO register 52, the burst info FIFO register 82 and the mask FIFO register 84. Such possibility of managing up to N outstanding bursts arises from the partition of the decryption processing pipeline in different stages and from the exploitation of parallel processing.

In a circuit 100 as exemplified in FIG. 1, while burst requests are waiting for the corresponding response, the decryption procedure may be continuously triggered to generate the required masks, thus facilitating increasing the performance of the core and/or taking advantage of cache refill.

As previously noted, a possible application for a decryption method as exemplified herein is, for instance, the execution of encrypted code, for instance stored in an external memory, by a processing core MCU. For instance, caching may be applied to anticipate the execution of commands and to improve the performance of the processing core MCU. As a result of the processing core MCU executing a certain instruction, caching may speculate on the successive instructions to be performed by the processing core MCU, and may try to retrieve such instructions from the external memory for possible use in successive processing.

Therefore, in a circuit 100 as exemplified in FIG. 1, receiving a burst request for encrypted data units stored in an external memory, the encrypted data units corresponding, for instance, to certain code instructions for execution by the processing core MCU, may trigger a speculative prediction of burst requests for encrypted data units stored in the external memory at successive addresses.

In a circuit 100 as exemplified in FIG. 1, triggering of the decryption procedure for mask generation may be managed by the FSM module 64. For instance, the FSM module 64 may trigger the generation of masks for the decryption of such speculated successive bursts when the keystream generator circuit module 70 is free.

In a circuit 100 as exemplified in FIG. 1, the address generation may comprise two phases, the first phase being the generation of all the mask addresses required for the incoming bursts, and the second phase being the generation of subsequent mask addresses, for instance by performing speculative triggering of the mask generation.

In a circuit 100 as exemplified in FIG. 1, before starting any speculation on possible subsequent mask addresses, it is preferable to complete the generation of the addresses corresponding to the bursts received and potentially stored into the FIFO registers. A single burst can indeed cover (due to potentially big burst length, i.e., a high number of data beats in the response data transfer) a large memory area, possibly involving more than one mask (for instance more than one 128-bit mask).

In a circuit 100 as exemplified in FIG. 1, the address generation process, based on the burst start address, burst length, burst size, and burst type (for instance fixed, wrapping, or incremental), can be complex depending on the burst length.

For instance, the address generation process may be complex due to the necessity of computing sums and products between long numbers (for instance, 128-bit numbers).

Therefore, in a circuit 100 as exemplified in FIG. 1, the address generation process is preferably addressed step by step by the FSM module 64 and may proceed in parallel with the mask computation.

As a result of the address generation process being completed (i.e., all the mask addresses required for the incoming bursts having been computed) and the keystream generator circuit module 70 being free again, speculation about the next incoming burst that can be received on the bus address read channel 10 may be performed.

It will be appreciated that the term subsequent previously used has also to be interpreted in a "smart" way, meaning that in the case of a wrapping address burst, the address to be predicted is probably not linked to the start address of the burst, but to the final last address computed by the FSM module 64, because presumably the operation of the core will progress from that point.

In a circuit 100 as exemplified in FIG. 1, the FSM module 64 may be configured to operate as a finite state machine having the behavior exemplarily described the following.

The finite state machine may have an "IDLE" state, a "mask address generation" state, a "prefetch" state and a "prefetch done" state.

The IDLE state may be reached only as a result of resetting the whole decryption circuit or as a result of receiving an "IP Enable" signal. As a result of the FSM being in the IDLE state, the decryption processing module 72 is free (i.e., the decryption procedure is not running) and there is no burst to be decrypted. Receiving a "burst_valid" signal, indicative of a valid incoming burst being received on the address read channel 10, may trigger the decryption flow, causing the FSM to shift to the mask address generation state.

As a result of the FSM being in the mask address generation state, the decryption processing module 72 may be activated. More than one clock cycle, for instance 11 clock cycles, may be required to complete the mask generation. At the same time, the computation of the next mask address may be ongoing. Reaching the end of the mask address generation process in absence of any following burst available on the address read channel 10 may trigger the prefetch phase, causing the FSM to shift to the prefetch state.

In one or more embodiments the decryption processing module 72 may be activated as a result of the FSM transitioning to the prefetch state, with at least one mask address being prefetched.

The prefetch processing can be aborted at any moment, for instance in case an incoming burst, triggering a burst_valid signal, has an address that is different from the address which has been speculated. In this case, the standard decryption flow is activated. In any case a burst_valid signal will cause the FSM to shift to the mask address generation state. Reaching the end of the mask address prefetch process in absence of a burst_valid signal may cause the FSM to shift to the prefetch done state.

As a result of the FSM being in the prefetch done state, a successfully prefetched mask is temporarily stored in the mask FIFO register 84, waiting for a new burst. The decryption processing module 72 may be kept on hold. As a result of receiving a burst_valid signal, the standard flow may be activated again.

In a circuit 100 as exemplified in FIG. 1, the decrypt controller circuit module 80 may be responsible for the XORing operation between response data units and corresponding decryption masks.

As previously noted, significant and concise information may be extracted, for each incoming burst, from the burst by the FSM module 64, and stored as mask header in the burst info FIFO register 82 to manage the response data flow. In a circuit 100 as exemplified in FIG. 1, this concise information may comprise:

a "burst_type" field, for instance encoded in 2 bits, providing information about the type of the corresponding burst, for instance fixed, incremental, or wrapping;

a "start_address" field, for instance encoded in 5 bits, providing the start address of the data of the burst to be retrieved, for instance, in an external memory;

a "size" field, for instance encoded in 3 bits, providing information about the size of the data units in the corresponding burst;

a "length_for_wrapping" field, for instance encoded in 2 bits, providing information about the address range covered by the burst and explored by the decrypt controller circuit module 80 in the case of a wrapping burst.

For instance, a possible encoding for the length_for_wrapping field in the case of a 2-bit values encoding may be the following:

00: wrap after 2 bytes,
01: wrap after 4 bytes,
10: wrap after 8 bytes, and
11: wrap after 16 bytes.

As exemplified above, the information required for the correct decryption of the retrieved data units may be stored in a single header for each incoming burst, each header having the size of for instance 12 bits. Therefore, a circuit 100 as exemplified in FIG. 1 may facilitate a reduction of the circuit area by improving the mask/data selection and association procedure.

In a circuit 100 as exemplified in FIG. 1, the decrypt controller circuit module 80 may compute the current data addresses (offsets) for data beats in a burst requiring decryption processing, according to the algorithm described in the following.

<SH>

At the beginning of the decryption process of a certain burst, a start address, whose size in bits may be dependent on the size in bits of the data bus, for instance being encoded in 5 bits in the case of a 64-bit data bus, may be initialized accordingly to the burst start address as stored in the corresponding data entry in the burst info FIFO register 82.

As a result of a data beat being retrieved from the external memory and being available on the data read channel 20 for processing in the decrypt controller module 80, a "RVALID" signal may be triggered by the memory controller MC (for instance, set to "1"), the "RVALID" signal being readable by the decrypt controller circuit module 80.

In a circuit 100 as exemplified in FIG. 1, the current data address may therefore be computed in different manners according to the type of the corresponding burst.

If the burst is of the fixed type, the start address is not incremented and one single mask is used for all the data beats comprised in the same burst.

If the burst is of the incremental type, the current data address in computed by incrementing, at each occurrence of the RVALID signal, the burst start address by the size of the data beats (for instance 4 bytes).

If the burst is of the wrapping type, the current data address is computed by incrementing, at each occurrence of the RVALID signal, the burst start address by the size of the data beats (for instance 4 bytes), wrapping (for instance going back to the initial start address) at length_for_wrapping*size.

In a circuit 100 as exemplified in FIG. 1, the XOR operation, if required, is performed by the XOR logic module 89 on the whole data bus.

In a circuit 100 as exemplified in FIG. 1, one bit of the current data address (for instance the fourth rightmost bit) may be used as a selector for deciding which portion of the mask should be used in the XOR operation (for instance, the first or the second half of the mask). For instance, in the case of a 128-bit mask and a 64-bit data bus, if the value of the selector bit is equal to "0" then the first half of the mask may be used (i.e., the part of the mask identified by bits 63:0), while if the value of the selector bit is equal to "1" then the second half of the mask may be used (i.e., the part of the mask identified by bits 127:64).

It will be appreciated that, also in this case, referring to "1" and "0" values, respectively, is merely by way of example: a complementary choice (for instance "0" and "1" values, respectively) or any other suitable Boolean encoding of such information may in fact be adopted by a circuit 100 as exemplified in FIG. 1.

In a circuit 100 as exemplified in FIG. 1, one bit of the current data address (for instance the fifth rightmost bit) may be used as a trigger for a mask change.

For instance, a change in the value of such "mask change trigger" bit, either from "0" to "1" or from "1" to "0", may trigger the "popping" of a decryption mask from the mask FIFO register 84.

As a result of the last data beat corresponding to a certain burst request being retrieved from the external memory and being available on the data read channel 20 for processing in the decrypt controller module 80, a "RLAST" signal may be triggered (for instance, set to "1"), readable by the decrypt controller circuit module 80. Such RLAST signal being equal to "1" may notify to the decrypt controller circuit module 80 that the end of the response data flow corresponding to a certain burst request has been reached.

It will otherwise be appreciated that the above-mentioned sizes (for instance the data bus size, the mask size, the FIFO registers depth, the mask header size, the start address size, etc.) and the positions of the selector bit and of the mask change trigger bit in the current data address can be generalized without departing from the extent of protection.

In the foregoing, a decryption/encryption circuit 100 and a method of operating such circuit have been described with regard to decryption processing of data retrieved in an external memory for use by a microcontroller MCU.

As discussed in Italian patent Application No. 102018000003373 (not yet available to the public at the date of filing of the instant application) such circuit may provide fast on-the-fly decryption of such retrieved data.

However, similar issues may be involved with regard to encryption processing. For instance, data encryption may be performed by device vendors for generating such encrypted data stored in a memory, for instance for cooperation with a microcontroller.

A first possibility for generating encrypted data may be running dedicated encryption software on a general purpose processing unit. Such approach may result in a long computation time.

Figure 2:
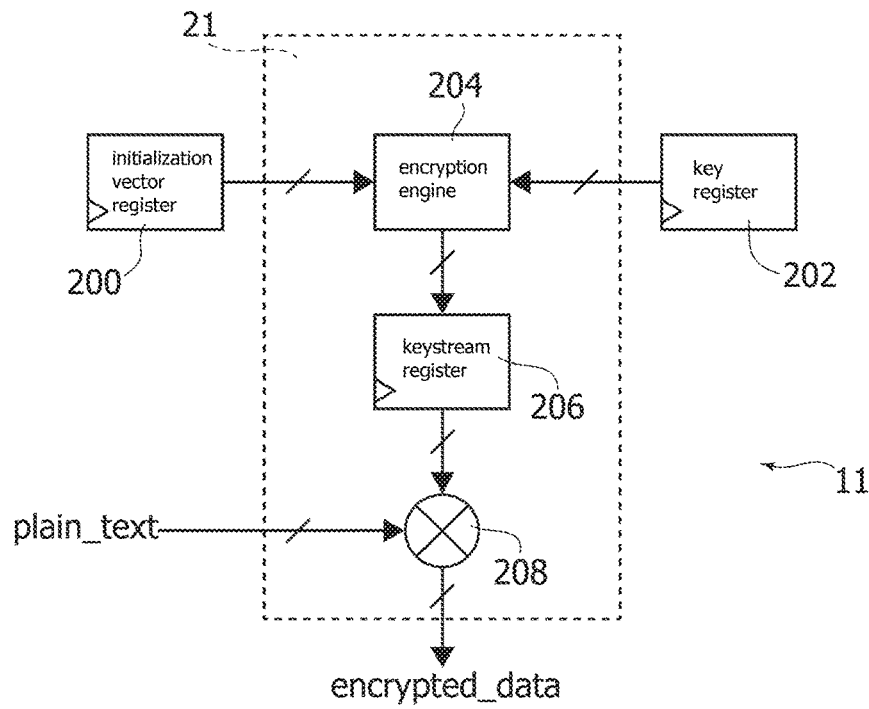
FIG. 2 is a block diagram exemplary of an encryption engine according to an embodiment of the present disclosure.

Another possibility for generating encrypted data may be using a dedicated encryption IP core 11 as exemplified in FIG. 2.

As exemplified in FIG. 2, an encryption circuit 21 may receive input initialization vectors from an initialization vector register 200 and input secret keys from a key register 202 for computing keystreams.

The detailed procedure for computing keystreams may vary depending on the encryption procedure involved, for instance the 128-bits AES (counter) algorithm. Computation of encryption key streams according to a certain encryption procedure such as an AES algorithm is known to the person skilled in the art, and thus a detailed description will not be provided herein.

Keystreams computed by an encryption engine 204 in the encryption circuit 21 may be stored in a keystream register 206.

Such computed (and stored) keystreams may then be processed with input plain text data "plain_text" in a XOR processing module 208. For instance, the XOR processing module 208 may perform bitwise XOR operation between an input keystream from the keystream register 206 and an input plain text data unit.

The output "encrypted_data" of such XOR processing module 208 is the encrypted data (for instance, encrypted executable code) corresponding to the input plain text data, which is suitable to be stored in an (external) memory at a certain address for cooperation with a microcontroller unit.

In a procedure as exemplified in FIG. 2, dimensions of initialization vectors and secret keys may be adapted to the dimension of the generated keystreams, which may vary. For instance, 128-bits initialization vectors and 128-bits secret keys may be used for generating 128-bits keystreams.

Moreover, also the dimensions of plain text data units and encrypted data units may vary. For instance, plain text data units and encrypted data units may be 128-bits long. Alternatively, plain text data units and encrypted data units may be shorter, for instance 64-bits long. In such second case, if the generated keystreams are 128-bits long, a single keystream may be used for encrypting plural data units. It will therefore be appreciated that several features previously described with regard to decryption processing may apply also to encryption processing, such as, for instance, the use of a single keystream for encryption of plural data units.

A certain plain text data unit may require a certain keystream for encryption, such keystream being the same keystream required for successive decryption of the corresponding encrypted data unit in a decryption processing as described with reference to FIG. 1.

In fact, as described in the foregoing, the keystream associated with a certain data unit depends on the address of the data unit in the (external) memory where the data unit is stored, for instance as a result of the initialization vector being dependent on the address of the corresponding data unit.

Therefore, encrypting a set of plain text data units may involve using a set of initialization vectors and secret keys for generating a corresponding set of keystreams.

In a procedure as exemplified in FIG. 2, computation of a set of keystreams may require reconfiguration (for instance, providing a different initialization vector and/or secret key) of the encryption engine 204 for computing different keystreams. For example, computation of each keystream may involve reconfiguring the encryption engine 204.

Therefore, in a procedure as exemplified in FIG. 2, it may not be possible to perform any speculation on successive data addresses for reducing the computation time of keystreams. In fact, information about addresses of data units may be available (only) in an "on-the-fly" decoder circuit as exemplified in FIG. 1 with regard to decryption processing.

In a procedure as exemplified in FIG. 2, several attempts of properly configuring a dedicated encryption IP core 11 may be involved in order to match a respective configuration of a decryption IP core 100 as exemplified in FIG. 1 for respective data units. Configuring a dedicated encryption IP core 11 for the encryption of data to be decrypted by a decryption IP core 100 may increase the possibility of introducing errors, for instance errors in a key, an address and/or an initialization vector.

Therefore, a possibility to improve encryption processing is to configure a decryption engine 100 as exemplified in FIG. 1 to be switchable to an "encryption state", in which the engine performs encryption of data. In such case, no additional configuration of a dedicated encryption IP core may be involved. Moreover, using a decryption engine 100 for performing encryption of data may result in a shorter encryption time by relying on the "speculative" behavior described above.

Figure 3:
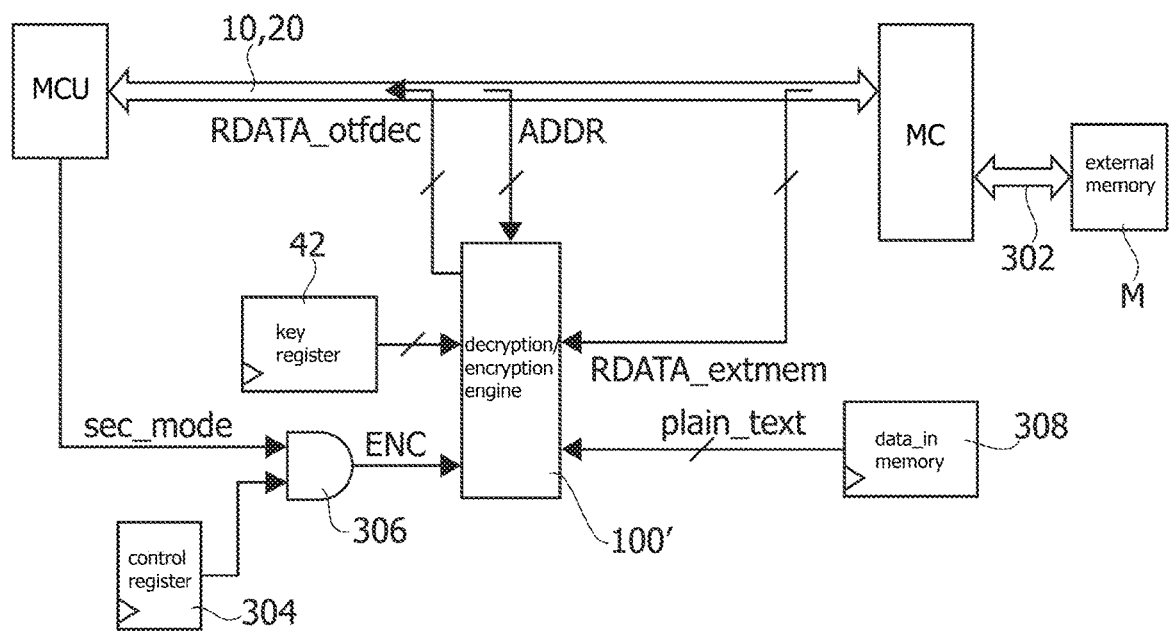
FIG. 3 is a block diagram exemplary of a possible context of use of embodiments of the present disclosure.

FIG. 3 is exemplary of one or more embodiments providing such improved solution.

As exemplified in FIG. 3, a microcontroller MCU and a memory controller MC are coupled via a communication bus comprising an address read channel 10 and a data read channel 20, in a configuration similar to the one exemplified in FIG. 1. The memory controller MC is configured to control access to an external memory M via a suitable connection 302.

A decryption/encryption engine 100', similar to a circuit 100 as exemplified in FIG. 1, is coupled to the data bus 10, 20 and is configured to operate alternatively as a decryption engine or as an encryption engine, as a function of a control signal ENC.

It is noted that the key register 42, which is shown to be part of the circuit 100 in the exemplary diagram of FIG. 1, is shown as a module external to the circuit 100' in the exemplary diagram of FIG. 3.

When operating as a decryption engine, the decryption/encryption engine 100' exemplified in FIG. 3 may:

receive data access requests for data units stored in the external memory M at certain data start addresses "ADDR" and read data start addresses "ADDR" of (encrypted) data units over the address read channel 10, read (encrypted) data units "RDATA_extmem" retrieved from the external memory M through the memory controller MC and the data read channel 20 of the communication bus, generate decryption masks as a function of the data start addresses "ADDR" of the respective encrypted data units and possibly as a function of speculated data start addresses as previously described, decrypt the retrieved encrypted data units by applying thereto the generated decryption masks, and provide the decrypted data units "RDATA_otfdec" to the microcontroller MCU over the communication bus 10, 20.

When operating as an encryption engine, the decryption/encryption engine 100' exemplified in FIG. 3 may:

receive "fake" (or "dummy") data access requests for data units stored in the external memory M at certain data start addresses "ADDR" and read such data start addresses "ADDR" over the address read channel 10, wherein the addresses "ADDR" correspond to the memory addresses where the encrypted data units should be stored, read plain text data units "plain_text" retrieved from a dedicated data_in memory 308, for instance a data_in register, generate encryption masks as a function of the data start addresses "ADDR" and possibly as a function of speculated data start addresses as previously described, encrypt the retrieved plain text data units by applying thereto the generated encryption masks, and provide the encrypted data units "RDATA_otfdec" to the microcontroller MCU over the data bus 10, 20 for successive storage in the external memory M starting from the address "ADDR".

In one or more embodiments, the microcontroller MCU may be configured to store the encrypted data units provided by a decryption/encryption engine 100' in the external memory M via dedicated address and data write channels (not visible in the figures).

It will be appreciated that the data start addresses of plain text data units which are referred to herein are the start addresses that such data units will occupy in the external memory M once encrypted and stored therein.

Therefore, the circuit 100' exemplified in FIG. 3 may operate alternatively as a decryption engine or as an encryption engine. Such operation as decryption or encryption engine may depend on the value of a (binary) control signal ENC which is provided to the circuit 100', as exemplified in FIG. 3.

For instance, in an embodiment as exemplified herein and in the following FIGS. 4 and 5, the control signal ENC being equal to 1 is indicative of the circuit 100' operating as an encryption engine, and the control signal ENC being equal to 0 is indicative of the circuit 100' operating as a decryption engine.

It will be noted that a complementary choice of the values of the control signal ENC is possible, requiring only small adjustments in the architecture of the corresponding embodiments, such as insertion of inverters and/or exchange of inputs of multiplexers. Such adjustments are easily implementable by the person skilled in the art, thus a more detailed description will not be provided herein.

In one or more embodiments as exemplified in FIG. 3, the value of the control signal ENC can be set to 1 (that is, the decryption/encryption engine 100' can be set to operate as an encryption engine) only when the processing unit MCU operates in a secure mode.

This may be achieved, for instance, by producing the control signal ENC at the output of an AND logic gate 306 having a first input coupled to a signal "sec_mode", for instance a signal provided by the processing unit MCU, for instance provided by a flash interface embedded in the processing unit MCU, and indicative of whether the processing unit MCU operates in a secure mode (sec_mode=1) or not (sec_mode=0), as exemplified in FIG. 3. Therefore, the control signal ENC may not be set to 1 if the processing unit MCU does not operate in secure mode (that is, if sec_mode=0).

Such a secure mode of operation of the processing unit MCU may involve an operating condition of the processing unit MCU which may be retrieved from the flash memory of the processing unit MCU as a result of the processing unit MCU being under reset, for instance during a so-called option byte loading phase. As a result of the processing unit MCU operating in a secure mode, secure resources of the processing unit may be available, such as, for instance, the write capability of the control signal ENC as previously described.

In one or more embodiments, the data_in memory 308 may be accessible only as a result of the processing unit MCU operating in a secure mode for security reasons.

In one or more embodiments, a second input of the AND logic gate 306 may be coupled to a control register 304 of the encryption/decryption engine.

Therefore, FIG. 3 is exemplary of one or more embodiments, wherein a decryption/encryption engine 100', possibly performing speculative triggering of the decryption/encryption procedure, may switch between the decryption and encryption working modes as a function of a control signal ENC.

Figure 4:
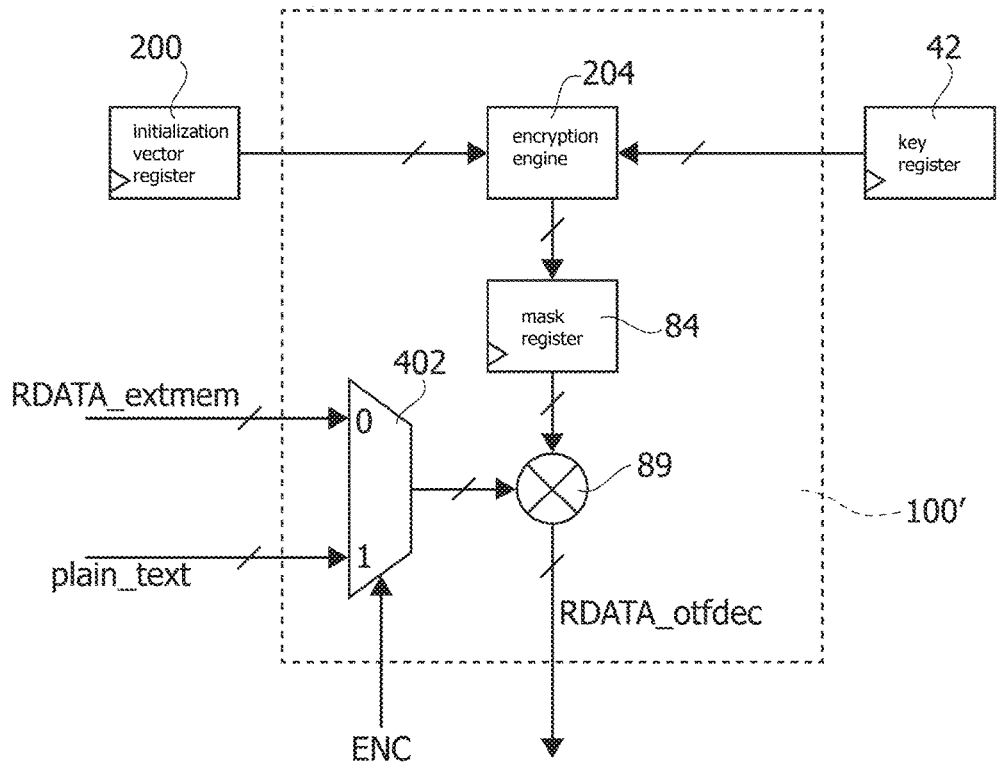
FIG. 4 is a block diagram exemplary of implementation details of embodiments of the present disclosure.

In one or more embodiments, alternative operation of the circuit 100' as a decryption or encryption engine may involve operation of a multiplexer circuit 402 as exemplified in FIG. 4.

It is noted that a circuit 100' as exemplified by the dashed rectangle in FIG. 4 may be understood as comprising the circuit modules and sub-modules of a circuit 100 as exemplified in FIG. 1. The mask register 84 and the XOR module 89 exemplified in FIG. 1 are explicitly visible also in FIG. 4. The crypto engine 204 exemplified in FIG. 4 operates similarly to a keystream generator circuit module 70 as exemplified in FIG. 1. Other modules and sub-modules visible in FIG. 1 are not visible in FIG. 4 for ease of illustration only.

The decryption/encryption pipeline of a circuit 100' may thus be configured to operate according to the decryption pipeline of a circuit 100 as previously described with reference to FIG. 1.

Therefore, initialization vectors may be computed, for instance by a decryption/encryption manager circuit module 60, as a function of a data start address "ADDR" read from the address read channel 20.

Such computed initialization vectors may be stored in a respective initialization vector register 200 as exemplified in FIG. 4.

Alternatively, in one or more embodiments, initialization vectors may be computed by a combinational logic circuit block as a function of the data start address "ADDR" and provided to a crypto engine 204.

A crypto engine 204, for instance a standard AES crypto engine optionally managed in a "speculative" way as previously described, may generate, as a function of initialization vectors and of secret keys retrieved from the key register 42, keystreams to be stored in the mask register 84.

The initialization vectors may be retrieved from the register 200 or may be provided to the crypto engine 204 by a combinational logic circuit block.

Keystreams stored in the mask register 84 may be provided at a first input of a XOR processing module 89, with the second input of the XOR processing module 89 being either an encrypted data unit "RDATA_extmem" retrieved from the external memory M (in case ENC=0) or a plain text data unit "plain_text" retrieved from the data_in memory 308 (in case ENC=1).

The XOR processing module 89 may provide output data units "RDATA_otfdec" by applying bitwise XOR processing between keystreams and data units received at its first and second inputs, respectively.

Therefore, if ENC=0, the output "RDATA_otfdec" provided by the circuit 100' to the processing unit MCU is the plain text corresponding to the encrypted data unit "RDATA_extmem" retrieved in the external memory M at the address "ADDR". Conversely, if ENC=1, the output "RDATA_otfdec" provided by the circuit 100' to the processing unit MCU is the cipher text corresponding to the plain text data unit "plain_text" retrieved from the data_in memory 308 and expected to be stored in the external memory M at the address "ADDR".

As noted, encryption processing may be triggered in the circuit 100' by receiving fake (or dummy) data access requests over the address read channel 10.

Figure 5:
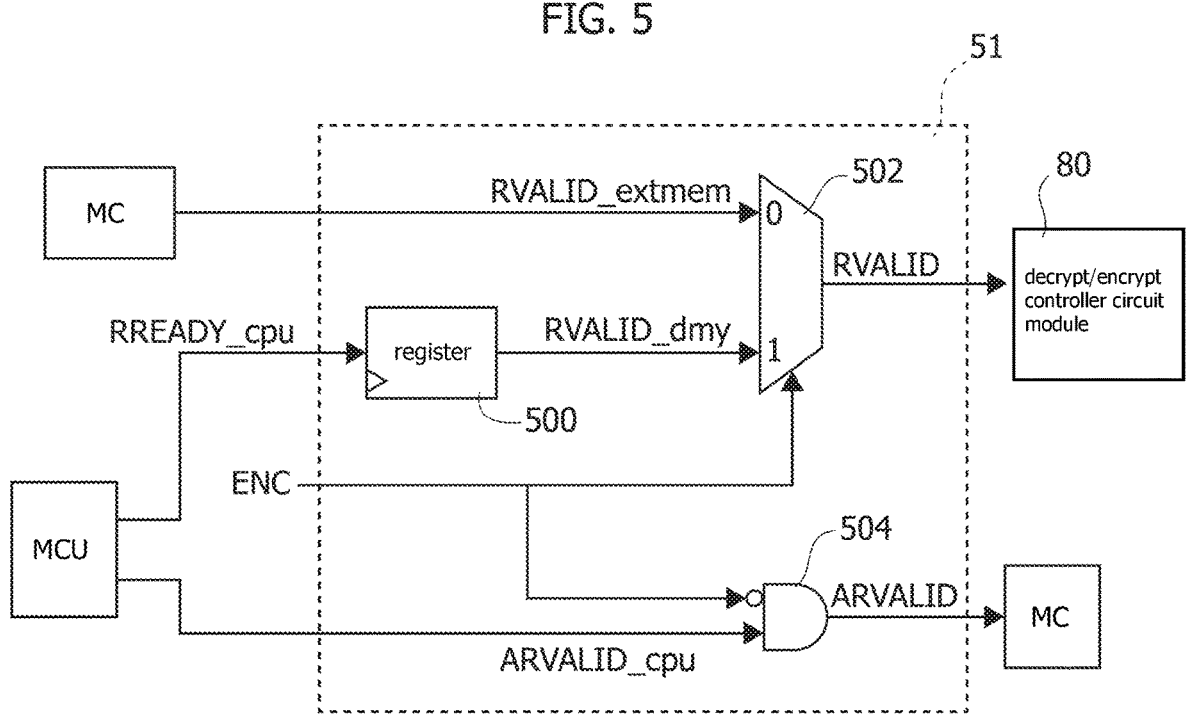
FIG. 5 is a block diagram exemplary of implementation details of embodiments of the present disclosure.

In fact, in one or more embodiments the circuit 100' may also comprise a control circuit 51 as exemplified in FIG. 5 for managing fake (or dummy) data access requests.

In one or more embodiments, a control circuit 51 may provide a first output signal RVALID, for use as an input signal to the decrypt/encrypt controller circuit module 80 of an encryption circuit 100'.

While exemplified herein as a distinct element for ease of explanation, in one or more embodiments, the control circuit 51 may be included in the decrypt/encrypt controller circuit module 80, which is also shown in FIG. 1.

As previously described with regard to a circuit 100 as exemplified in FIG. 1, the signal RVALID is indicative of the availability of input data for decryption/encryption processing by the circuit 100'.

As exemplified in FIG. 5, if the circuit 100' operates as a decryption engine (i.e., ENC=0), the signal RVALID provided by the control circuit 51 is a replica of the signal RVALID_extmem provided by the memory controller MC. Therefore, the signal RVALID may be triggered (for instance, set to high) when encrypted data units retrieved from the external memory M are available on the data read channel 20 for decryption processing in the circuit 100'. In one or more embodiments, as a result of the circuit 100' operating as a decryption engine, the signal RVALID_extmem propagated to the decrypt/encrypt controller circuit module 80 may be controlled, for instance in order to handle latency which may occur during operation of the decryption circuit. For instance, encrypted data units for decryption may be retrieved from the external memory before the corresponding decryption masks are available, with such latency being managed by delaying the propagation of the signal RVALID_extmem.

Alternatively, if the circuit 100' operates as an encryption engine (i.e., ENC=1), the signal RVALID provided by the control circuit 51 is a replica of the signal RVALID_dmy provided at the output of a register 500 (for instance, a flip-flop register), the register 500 receiving as an input a signal RREADY_cpu provided by the processing unit MCU.

For instance, in case the processing unit MCU is a microcontroller unit, the signal RREADY_cpu may be provided by a CPU processing unit embedded into the microcontroller unit MCU, for instance by the direct memory access controller (DMAC) of the CPU processing unit. Since the CPU processing unit may not be ready to process data at certain times, the register 500 may operate as a pulse generator which generates a "pulse" (for instance, goes to high) to indicate that a data beat is available for processing in case the CPU processing unit is ready for processing.

Therefore, the signal RVALID may be triggered (for instance, again, set to high) when the processing unit MCU issues a fake (or dummy) data access request over the address read channel 10 and triggers the signal RREADY_cpu.

A control circuit 51 may provide a second output signal "ARVALID", for use as an input signal to the memory controller MC. The signal ARVALID is indicative of a data access request for data units stored in the external memory M issued over the bus 10.

It will be noted that the memory controller MC is drawn twice in FIG. 5 for the sake of ease of illustration only. In fact, the two blocks identified with reference MC in FIG. 5 refer to the same memory controller.

As exemplified in FIG. 5, if the circuit 100' operates as a decryption engine (i.e., ENC=0), the signal ARVALID provided by the control circuit 51 to the memory controller MC is a replica of a signal ARVALID_cpu provided by the processing unit MCU, the signal ARVALID_cpu being indicative of a data access request for data units stored in the external memory M issued over the bus 10 by the processing unit MCU.

Therefore, the signal ARVALID may be triggered (for instance, set to high) when the processing unit MCU issues a data access request.

If the circuit 100' operates as an encryption engine (i.e., ENC=1), the signal ARVALID provided by the control circuit 51 may be set to 0. This allows for issuing dummy data access requests as mentioned above, wherein the data access requests issued by the microcontroller MCU can be notified to the encryption circuit 100' without being propagated to the memory controller MC.

For instance, even if a request is not propagated to the memory controller MC, a signal such as an ARREADY signal coming from it may be kept unchanged, for instance equal to '1' as the memory controller is idle, and propagated to the MCU with an indication that the request has been "smart" granted.

In fact, as a result of the circuit 100' operating as an encryption engine, input data for the XOR processing module 208 are retrieved from the data_in memory 308, without intervention of the memory controller MC, as previously described.

It is noted that, in one or more embodiments, the processing unit MCU may comprise the above-mentioned CPU processing unit, and slaves such as the external memory controller interface MC and internal memories such as a flash memory and/or a RAM memory. In this case, also the communication bus 10, 20 is internal to the processing unit MCU.

In one or more embodiments, the processing unit MCU may comprise the decryption/encryption engine 100'.

One or more embodiments may thus provide the possibility of switching the functionality of a circuit performing speculative triggering of an encryption/decryption procedure (for instance, an AES counter algorithm) between a decryption working mode and an encryption working mode by using a (one-bit) control signal ENC and a reduced number of logic gates, such as multiplexers and AND gates, and memory blocks such as registers.

One or more embodiments may thus be advantageous in providing a reversible crypto engine, without involving a dedicated engine for encryption purposes.

In one or more embodiments, a reduced number of logic gates and registers for implementing the switching between encryption and decryption working modes may result in a small impact on the silicon area.

In one or more embodiments, providing the plain text data for encryption through a dedicated memory 308 may facilitate increasing the security of the encryption processing, since no plain text data may be provided on external memories.

In one or more embodiments, plural data units (for instance, 32-bits data units) may be XOR-processed with a single keystream (for instance, a 128-bits keystream), for instance by using different keystream portions. Therefore, the data_in memory 308 may have a reduced dimension.

In one or more embodiments, a method may comprise: providing memory locations (for instance, M) for storing encrypted data (for instance, RDATA_extmem), the memory locations having respective addresses and being accessible via a communication bus (for instance, 10, 20) for reading data stored therein, receiving (for instance, 32) over the communication bus (for instance, 10) access requests to the memory locations, wherein the access requests may comprise burst requests for access to respective sets of memory locations starting from respective start addresses (for instance, ADDR), the burst requests conveying the respective start addresses, calculating (for instance, 204), as a function of the start addresses, encryption/decryption cryptographic masks based on cryptographic keys, receiving (for instance, 308) plain text data (for instance, plain_text) for encryption and applying (for instance, 208) the cryptographic masks to the plain text data to obtain therefrom encrypted data, and including the encrypted data into output data (for instance, RDATA_otfdec) for transmission over the communication bus (for instance, 20).

In one or more embodiments, a method may comprise storing in the memory locations starting from respective start addresses the encrypted data transmitted over the communication bus.

One or more embodiments may comprise:

applying the cryptographic masks to the stored encrypted data retrieved via the communication bus from the memory locations starting from the respective start addresses to obtain therefrom decrypted data, and including the decrypted data into output data for transmission over the communication bus.

One or more embodiments may comprise:

receiving the access requests from a processing unit (for instance, MCU) coupled to the communication bus, and transmitting the output data to the processing unit via the communication bus.

One or more embodiments may comprise:

sensing (for instance, 306) a secure mode signal (for instance, sec_mode) indicative of the processing unit operating in a secure mode wherein security resources of said processing unit are available, applying the cryptographic masks to encrypt the plain text data or to decrypt the stored encrypted data as a function (for instance, ENC) of the value of the secure mode signal.

One or more embodiments may comprise retrieving the plain text data for encryption from a memory (for instance, 308), wherein the memory is accessible as a result of the value of the secure mode signal being indicative of the processing unit operating in the secure mode.

One or more embodiments may comprise making the memory locations selectively accessible via a memory controller (for instance, MC) coupled to the communication bus by selectively propagating the access requests to the memory locations to the memory controller as a function of a control signal (for instance, ENC).

In one or more embodiments, cryptographic masks may be applied to encrypt the plain text data or to decrypt the stored encrypted data as a result of receiving an input data availability signal (for instance, RVALID), the input data availability signal being provided (for instance, 502) by one of the memory controller (for instance, RVALID_extmem) and the processing unit (for instance, RVALID_dmy) as a function of the control signal.

In one or more embodiments, the access requests received over the communication bus may convey, along with the respective start addresses, supplemental information on data security, data unit size, burst request type and burst request lengths, and applying the cryptographic masks may comprise:

storing (for instance, 206) a set of calculated cryptographic masks, calculating (for instance, 62), as a function of an input data availability signal and the supplemental information, current data addresses (for instance, 85) for data (for instance, plain_text; RDATA_extmem) available for application of cryptographic masks, applying to the data available for application of cryptographic masks, cryptographic masks selected out of the cryptographic masks stored as a function of the current data addresses.

One or more embodiments may comprise providing in the current data addresses at least one mask change control bit, and changing (for instance, 86) at least one portion of the cryptographic masks applied as a result of changes of the value of the at least one mask change control bit.

One or more embodiments may comprise:

calculating (for instance, 72) the cryptographic masks by providing therein plural mask portions applicable to different data, providing in the current data addresses a first mask change control bit and a second mask change control bit, changing the cryptographic masks applied to the data as a result of changes of the value of the first mask change control bit, and changing the portions of the cryptographic masks applied to the data as a result of changes of the value of the second mask change control bit.

In one or more embodiments, the access requests received over the communication bus may convey, along with the respective start addresses, supplemental information on data unit size, burst request type and burst request lengths, and applying the cryptographic masks may comprise:

calculating, as a function of an input data unit availability signal and the supplemental information, current data addresses for data available for application of cryptographic masks, and calculating a set of candidate cryptographic masks applicable to future incoming access requests as a function of at least one of the start address of the last received access request, the current data unit address calculated for the last received access request, and burst type and storing at least one cryptographic mask out of the set of candidate cryptographic masks.

One or more embodiments may comprise calculating the cryptographic masks as a function of the start addresses via a processing pipeline (for instance, 3, 4, 5, 6, 7).

One or more embodiments may comprise checking (for instance, 32) whether the processing pipeline is available for processing incoming access requests, as a result of the processing pipeline being unavailable, storing (for instance, 38) incoming access requests in a register (for instance, 36).

In one or more embodiments calculating cryptographic masks as a function of the start addresses and applying cryptographic masks calculated may comprise applying Advanced Encryption Standard, AES, processing.

In one or more embodiments, a circuit configured for implementing a method according to one or more embodiments may comprise:

an input node (for instance, 32) configured for receiving over a communication bus access requests to memory locations, the memory locations being accessible via the communication bus, wherein the access requests may comprise burst requests for access to respective sets of the memory locations starting from respective start addresses, the burst requests conveying the respective start addresses, an output node configured for transmitting over the communication bus output data, and processing circuitry (for instance, 204, 206, 208) configured for:

i) calculating, as a function of the start addresses, encryption/decryption cryptographic masks based on cryptographic keys, ii) receiving plain text data for encryption, iii) applying the cryptographic masks to encrypt the plain text data to obtain therefrom encrypted data and/or to decrypt encrypted data stored in the memory locations to obtain therefrom decrypted data as a function of the value of a secure mode signal, and iv) including the encrypted data and/or the decrypted data into output data for transmission over the communication bus.

In one or more embodiments, a device may comprise:

memory locations for storing encrypted data, the memory locations (M) having respective addresses, a communication bus configured to convey access requests to the memory locations, wherein the access requests may comprise burst requests for access to respective sets of the memory locations starting from respective start addresses, the burst requests conveying the respective start addresses;

a circuit according to one or more embodiments, the circuit having an input node configured for receiving over the communication bus access requests to the memory locations, and an output node configured for transmitting over the communication bus output data; the circuit may be coupled to the communication bus to receive therefrom the burst requests and to transmit thereto output data.

Without prejudice to the underlying principles, the details and embodiments may vary, even significantly, with respect to what has been described by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
protecting a secure memory from unauthorized accesses, the protecting including:
receiving, by cryptographic circuitry from a processing circuit and over a communication bus, access requests to memory locations for storing encrypted data, said memory locations having respective addresses and being accessible via the communication bus for reading data stored in the memory locations, wherein said access requests include burst requests for access to respective sets of said memory locations starting from respective start addresses, the burst requests conveying said respective start addresses;
receiving, by the cryptographic circuitry, a secure mode signal indicating a security status of the processing circuit;
selectively enabling processing of the access request by cryptographic circuitry based on the secure mode signal, wherein the processing an access request includes:
determining, as a function of said start addresses, cryptographic masks based on cryptographic keys;
receiving plain text data for encryption and applying said cryptographic masks to said plain text data, generating encrypted data; and
including said encrypted data into output data for transmission over said communication bus.

2. The method of claim 1, wherein the processing the access request includes transmitting said output data over said communication bus and storing in said memory locations starting from said respective start addresses said encrypted data.

3. The method of claim 1, wherein the processing the access request includes:
retrieving said stored encrypted data via said communication bus from said memory locations starting from said respective start addresses;
applying said cryptographic masks to said retrieved stored encrypted data obtaining decrypted data; and
including said decrypted data into output data for transmission over said communication bus.

4. The method of claim 3, wherein the processing the access request includes:
transmitting said output data to said processing circuit via said communication bus.

5. The method of claim 1, wherein the processing the access request comprises retrieving said plain text data for encryption from a memory, wherein said memory is accessible as a result of the value of said secure mode signal being indicative of said processing circuit operating in a secure mode.

6. The method of claim 4, comprising making said memory locations selectively accessible via a memory controller coupled to said communication bus by selectively propagating said access requests to said memory locations to said memory controller as a function of a control signal.

7. The method of claim 6, wherein said cryptographic masks are applied to encrypt said plain text data or to decrypt said stored encrypted data as a result of receiving an input data availability signal, said input data availability signal being provided by one of said memory controller and said processing circuit as a function of said control signal.

8. The method of claim 3, wherein said access requests received over said communication bus convey, along with said respective start addresses, supplemental information on data security, data unit size, burst request type and burst request lengths, and the processing the access request comprises:
storing a set of cryptographic masks;
calculating, as a function of an input data availability signal and said supplemental information on data security, current data addresses for plain text data available for application of said set of calculated cryptographic masks; and
applying to said plain text data available for application of cryptographic masks, cryptographic masks selected, as a function of said current data addresses, out of said stored set of cryptographic masks.

9. The method of claim 8, comprising:
providing in said current data addresses at least one mask change control bit; and
changing at least one portion of the selected cryptographic masks applied as a result of changes of the value of said at least one mask change control bit.

10. The method of claim 9, comprising:
providing in the stored set of cryptographic masks plural mask portions applicable to different data units of the plain text data;
providing in said current data addresses a first mask change control bit and a second mask change control bit;
changing the cryptographic masks applied to said data units as a result of changes of the value of said first mask change control bit; and
changing the portions of said cryptographic masks applied to said data units as a result of changes of the value of said second mask change control bit.

11. The method of claim 3, wherein said access requests received over said communication bus convey, along with said respective start addresses, supplemental information on data unit size, burst request type and burst request lengths, and wherein applying said cryptographic masks comprises:
calculating, as a function of an input data unit availability signal and said supplemental information, current data addresses for data available for application of cryptographic masks; and
determining a set of candidate cryptographic masks applicable to future incoming access requests as a function of at least one of the start address of a last received access request, the current data unit address calculated for said last received access request, and burst type and storing at least one cryptographic mask out of said set of candidate cryptographic masks.

12. The method of claim 1, comprising:
determining said cryptographic masks as a function of said start addresses via a processing pipeline;
checking whether the processing pipeline is available for processing incoming access requests and
storing incoming access requests in a register in response to the processing pipeline being unavailable.

13. The method of claim 3, wherein determining cryptographic masks as a function of said start addresses and applying cryptographic masks calculated includes applying Advanced Encryption Standard, processing.

14. A circuit, comprising:
an input node configured to receive, from a microcontroller and over a communication bus, access requests to memory locations, said memory locations being accessible via said communication bus, wherein said access requests including burst requests for access to respective sets of said memory locations starting from respective start addresses, the burst requests conveying said respective start addresses;
a security node coupled to the microcontroller and configured to receive a security mode signal indicative of a security status of the microcontroller;
an output node configured to transmit over said communication bus output data; and
processing circuitry coupled to said input node, said security node and said output node and configured to enable processing of received access requests based on the security mode signal, wherein processing of a received access request includes:
calculating, as a function of said start addresses, encryption or decryption cryptographic masks based on cryptographic keys;
receiving plain text data for encryption or encrypted data stored in said memory locations;
applying said cryptographic masks as a function of a value of the security mode signal:
to encrypt said plain text data, generating encrypted data; or
to decrypt encrypted data stored in said memory locations, generating decrypted data; and
including said encrypted data or said decrypted data into output data provided on said output node for transmission over said communication bus.

15. The circuit of claim 14, wherein the processing circuitry is further configured to transmit said output data over said communication bus and to storage in said memory locations starting from said respective start addresses said encrypted data.

16. The circuit of claim 14, wherein the processing circuitry is configured to read said stored encrypted data via said communication bus from said memory locations starting from said respective start addresses and to apply said cryptographic masks to said read stored encrypted data to generate decrypted data from the read stored encrypted data, and is further configured to includes said decrypted data into output data for transmission over said communication bus.

17. A device, comprising:
memory locations configured to store encrypted data, said memory locations having respective addresses;
a communication bus coupled to the memory locations and configured to convey access requests to said memory locations, wherein said access requests include burst requests for access to respective sets of said memory locations starting from respective start addresses, the burst requests conveying said respective start addresses, the access requests being from a microcontroller; and
a circuit coupled to said communication bus and to the microcontroller and having:
an input node configured to receive over said communication bus access requests to said memory locations, wherein the access requests include burst requests for access to respective sets of said memory locations starting from respective start addresses, the burst requests conveying said respective start addresses,
a security node configured to receive a security mode signal indicative of a security mode of the microcontroller, wherein the circuit is configured to enable processing of access requests based on the security mode signal, and
an output node configured to transmit over said communication bus output data, wherein, in response to the processing of access requests being enable, the circuit is configured to calculate, as a function of said start addresses, encryption and decryption cryptographic masks based on cryptographic keys and to receive plain text data for encryption or encrypted data stored in said memory locations, and to apply said cryptographic masks to encrypt said plain text data to obtain encrypted data or to decrypt encrypted data stored in said memory locations to obtain therefrom decrypted data as a function of a value of a secure mode signal, and to include said encrypted data or said decrypted data in output data provided on said output node.

18. The device of claim 17, wherein the circuit is configured to transmit said output data over said communications to said microcontroller.

19. The device of claim 17, wherein the circuit is configured to calculate cryptographic masks based on cryptographic keys according to the Advanced Encryption Standard.

20. The device of claim 17, wherein the secure node, in operation, couples to a flash interface of the microcontroller.

21. The device of claim 17, wherein a value of the secure mode signal is set when the microcontroller is reset.

* * * * *

UNITED STATES PATENT AND TRADEMARK OFFICE
CERTIFICATE OF CORRECTION

PATENT NO. : 11,456,857 B2
APPLICATION NO. : 16/433847
DATED : September 27, 2022
INVENTOR(S) : Rosalino Critelli et al.

Page 1 of 1

It is certified that error appears in the above-identified patent and that said Letters Patent is hereby corrected as shown below:

In the Claims

In Column 22, Claim 15, Line 9:
"circuitry is further configured" should read: --circuitry is configured--.

In Column 22, Claim 17, Lines 56-57:
"to obtain therefrom decrypted" should read: --to obtain decrypted--.

Signed and Sealed this
Seventh Day of February, 2023

Katherine Kelly Vidal
*Director of the United States Patent and Trademark Office*